United States Patent
Ghosh et al.

(10) Patent No.: US 7,411,928 B2
(45) Date of Patent: Aug. 12, 2008

(54) SIMPLIFIED DECODER FOR A BIT INTERLEAVED COFDM-MIMO SYSTEM

(75) Inventors: Monisha Ghosh, Chappaqua, NY (US);
Xuemei Ouyang, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 141 days.

(21) Appl. No.: 10/537,221

(22) PCT Filed: Nov. 18, 2003

(86) PCT No.: PCT/IB03/05277

§ 371 (c)(1),
(2), (4) Date: Jun. 3, 2005

(87) PCT Pub. No.: WO2004/051914

PCT Pub. Date: Jun. 17, 2004

(65) Prior Publication Data

US 2006/0092882 A1 May 4, 2006

Related U.S. Application Data

(60) Provisional application No. 60/430,424, filed on Dec. 3, 2002.

(51) Int. Cl.
*H04Q 7/00* (2006.01)
(52) U.S. Cl. .................... 370/332; 370/343; 375/260
(58) Field of Classification Search ............... 370/343, 370/332, 208, 310, 380, 216, 203, 250–253; 375/260, 346–351, 267; 455/67.13, 452.2, 455/226.3
See application file for complete search history.

(56) References Cited

U.S. PATENT DOCUMENTS 7,167,684 B2 * 1/2007 Kadous et al. ........... 455/67.13

(Continued)

FOREIGN PATENT DOCUMENTS

WO    02062002    8/2002

(Continued)

OTHER PUBLICATIONS

Hori S et al: "A New Branch Metric Generation Method for Soft-Decision . . . "; IEICE Transactions on Fundamentals of Electronics, Communications and Computer Sciences Institute of Electronics Information and Comm. Eng. Tokyo, JP; vol. 7, No. E85-A, Jul. 2002; pp. 1675-1684; XP001141747.

(Continued)

*Primary Examiner*—Pablo N Tran
(74) *Attorney, Agent, or Firm*—Paul Im (57) ABSTRACT

Multiple input multiple output (MIMO) systems are candidates for higher data rate wireless communication systems. Currently, for a single input single output (SISO) 1802.11a system can provide a transmission data rate up to 54 Mbps. The present invention is a 2 by 2 Multiple In Multiple Out (MIMO) system having a decoding apparatus that increases the data rate to over 100 Mbps but at a computation cost about the same as for optimal decoding for a SISO system and 1/64 of the optimal decoding for a 2 by 2 MIMO system. At a bit error rate (BER) of 10-4 level, the 2 by 2 MIMO system of the present invention provides double the transmission data rate of the SISO system with approximately the same signal to noise ratio (SNR).

5 Claims, 6 Drawing Sheets

U.S. PATENT DOCUMENTS

| | | | |
|---|---|---|---|
| 2001/0053143 | A1 | 12/2001 | Li |
| 2002/0122383 | A1 | 9/2002 | Wu |
| 2004/0184398 | A1* | 9/2004 | Walton et al. ............... 370/203 |
| 2005/0052991 | A1* | 3/2005 | Kadous ...................... 370/216 |
| 2005/0078665 | A1* | 4/2005 | Yu et al. ..................... 370/380 |
| 2005/0128966 | A1* | 6/2005 | Yee ............................ 370/310 |
| 2005/0180312 | A1* | 8/2005 | Walton et al. ............... 370/208 |
| 2005/0281349 | A1* | 12/2005 | Kim ............................ 375/267 |
| 2006/0045062 | A1* | 3/2006 | Gorokhov et al. ........... 370/343 |
| 2007/0015543 | A1* | 1/2007 | Ojard ..................... 455/562.1 |

OTHER PUBLICATIONS

Van Zelst A: "Space Division Multiplexing Algorithms"; Proceedings of 10$^{TH}$ Mediterranean Electrotechnical Conference, Melecon 2000, IEEE; vol. 3, May 29, 2000; pp. 1218-1221, XP010518665; New York, US.

Dirk Benyoucef et al, "Spectral spreading by linear block codes for ODFM in powerline communications", OFDM workshop, 2002.

David Love, "A proposal to design a technique of quantized maximum ratio transmission", Wireless proposal, 2002.

Jiun Siew et al, "A Channel Estimation Method for MIMO-OFDM Systems", London Communications Symposium, Jul. 2002.

Djordje Tujkovic et al, "Space-Frequency Turbo Coded OFDM for Future High Data Rate Wideband Radio Systems", IST Mobile Communications Summit, Barcelona, Spain, 2001.

D. Gesbert et al, "Breaking the barriers of Shannon's capacity: An overview of MIMO wireless systems", Telektronikk Telenor Journal, 2002.

* cited by examiner

SIMPLIFIED DECODER FOR A BIT INTERLEAVED COFDM-MIMO SYSTEM

CROSS REFERENCE TO RELATED APPLICATION

This application claims the benefit of U.S. provisional application Ser. No. 60/430,424 filed Dec. 3, 2002, which is incorporated herein by reference.

The present invention relates to a simplified decoder for a coded orthogonal frequency division multiplexing-multiple input multiple output (COFDM-MIMO) system. More particularly, the present invention relates to a bit interleaved system with maximum (ML) likelihood decoding. Most particularly the present invention relates to a 2 by 2 MIMO system with Zero Forcing (ZF) guided maximum likelihood (ML) decoding that doubles the transmission data rate of a single input single output (SISO) IEEE 802.11a system based on orthogonal frequency division multiplexing (OFDM) technique.

MIMO systems have been studied as a promising candidate for the next generation of high data rate wireless communication system. Currently, for a single antenna system (SISO), IEEE 802.11a employing the OFDM modulation technique has a maximum data transmission rate of 54 Mbps. There is only one transmission antenna and one receiving antenna, i.e., it is a SISO system, and the signal constellation for 802.11a is 64 quadrature amplitude modulation (QAM). Transmission data rates in excess of 100 Mbps is a goal for the next generation wireless communication system.

Given the physical channel characteristics of wireless communication systems, it is almost impossible to increase the data rate with a single antenna system by increasing the order of the constellation of the signal.

Figure 1:
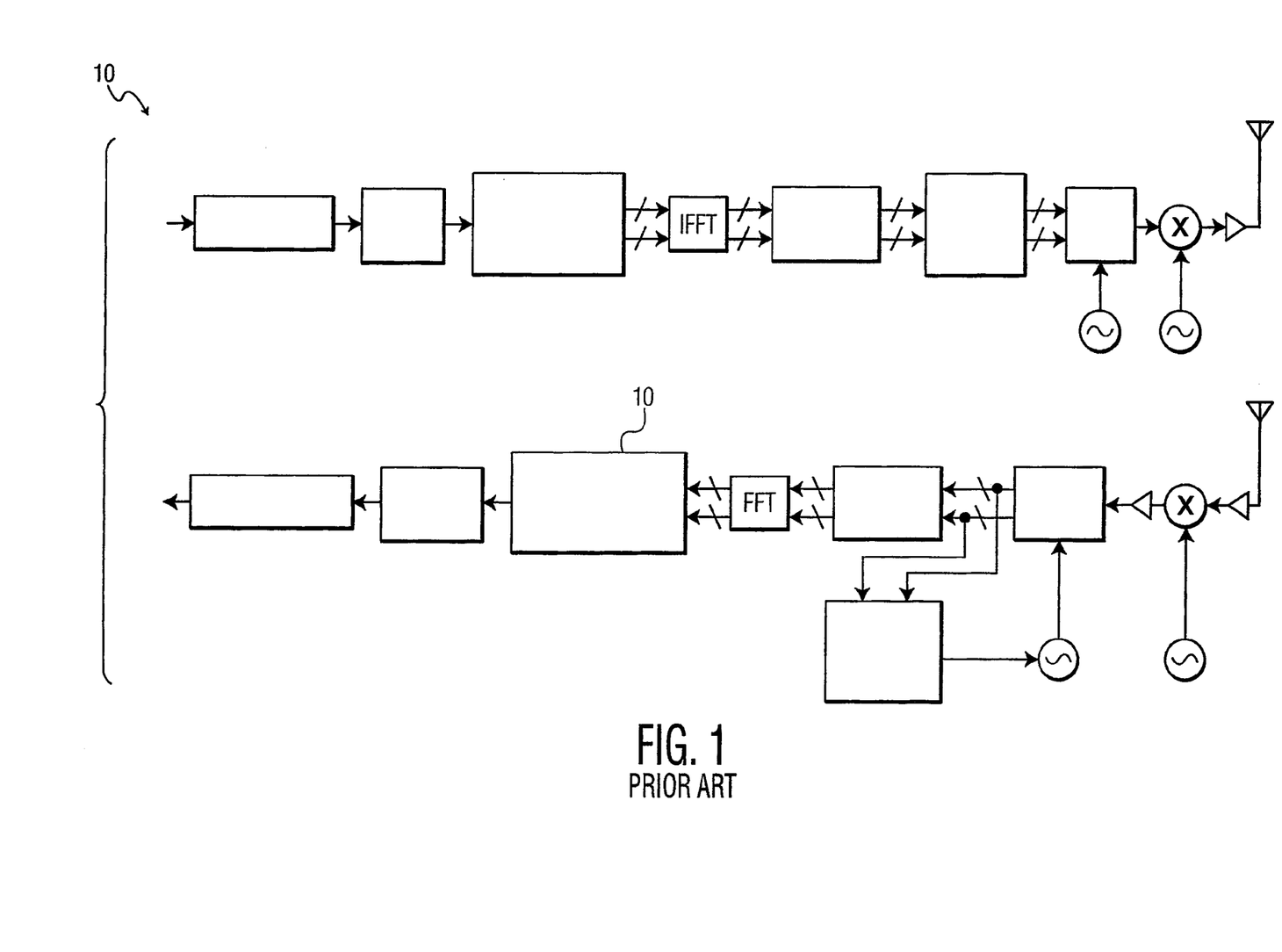
FIG. 1 illustrates a prior art 54 Mbps IEEE 802.11a SISO system based on OFDM modulation.
Figure 2:
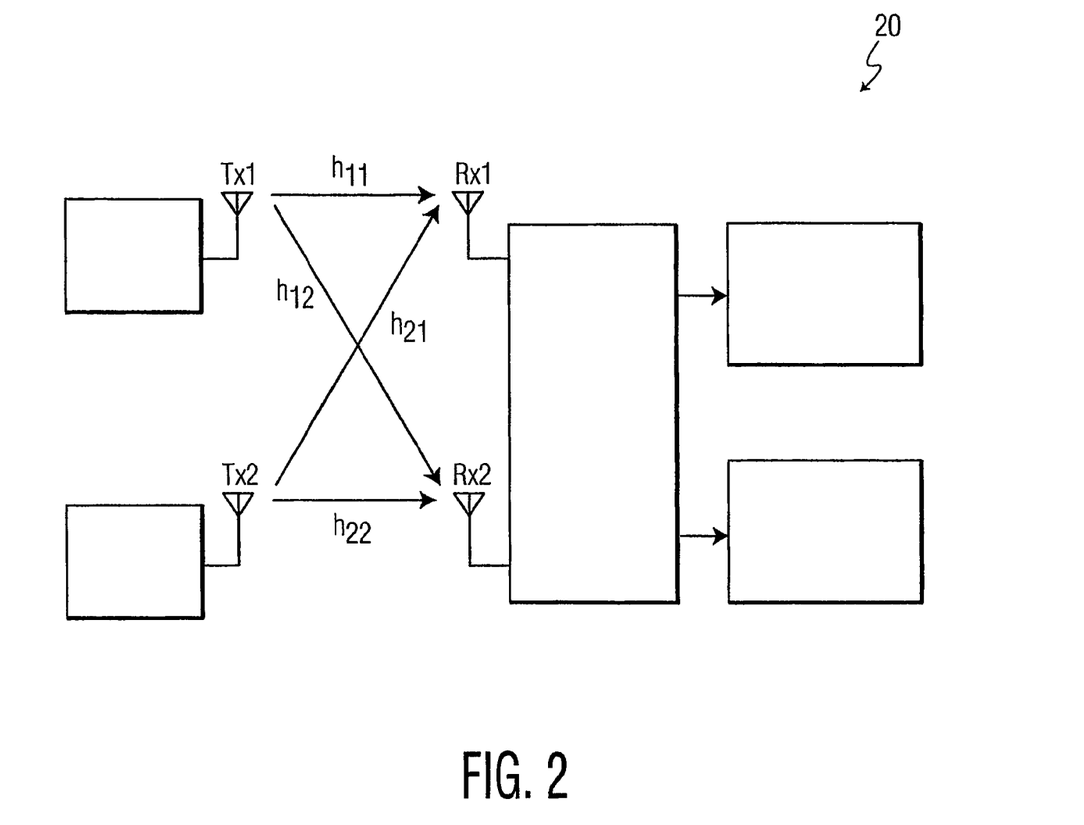
FIG. 2 illustrates a prior art 2 by 2 MIMO system.

One possible approach to achieving a greater than 100 Mbps data rate is a 2 by 2 MIMO system based on an IEEE 802.11a SISO system in which the two transmission antennae transmit different data streams that are coded in the same way as an 802.11a system at each antenna. This system can achieve a transmission data rate of 108 Mbps with approximately the same signal-to-noise ratio (SNR) as the prior art 54 Mbps IEEE 802.11a SISO system based on OFDM modulation that is illustrated in FIG. 1. FIG. 2 illustrates a prior art 2 by 2 MIMO system that could be used in this way.

Suppose the system of FIG. 2 employs optimal decoding and the wireless channel is defined as $$H = \begin{pmatrix} h_{11} & h_{21} \\ h_{12} & h_{22} \end{pmatrix},$$

where $h_{ij}$ 20 represents the channel from transmitter antenna i to receiver antenna j, i.e., Txi to Rxj. Without losing generality, assume the four channels are Rayleigh fading channels that are independent of one another. Then the received signal in frequency domain on subcarrier k can be expressed as $$\begin{pmatrix} r_1 \\ r_2 \end{pmatrix} = \begin{pmatrix} h_{11} & h_{21} \\ h_{12} & h_{22} \end{pmatrix} \begin{pmatrix} s_1 \\ s_2 \end{pmatrix} + \begin{pmatrix} n_1 \\ n_2 \end{pmatrix} \quad (1)$$

Since each subcarrier is decoded separately, the subscript ks in equation (1) is omitted. In optimal maximum likelihood (ML) detection, for each received signal pair, $r_1$ and $r_2$, to determine whether a transmitted bit in these symbols is '1' or '0', it is necessary to find the largest probability $$\max(p(r|b)) \quad (2)$$

where $$r = \begin{pmatrix} r_1 \\ r_2 \end{pmatrix} \text{ and } b = \begin{pmatrix} b_{1i} \\ b_{2i} \end{pmatrix}$$

are the bits in symbol $s_1$ and $s_2$ for which a decision needs to be made. In an add white gaussian noise (AWGN) environment, this is equivalent to finding $$\max_{s_m,s_n}\left( \frac{1}{\sqrt{2\pi}\,\sigma} e^{-\frac{|r_1-h_{11}s_m-h_{21}s_n|^2}{2\sigma^2}} * \frac{1}{\sqrt{2\pi}\,\sigma} e^{-\frac{|r_2-h_{21}s_m-h_{22}s_n|^2}{2\sigma^2}} \middle| b_{1i}, b_{2i} \right) = \quad (3)$$

$$\max_{s_m,s_n}\left( \frac{1}{2\pi\sigma^2} e^{-\frac{|r_1-h_{11}s_m-h_{21}s_n|^2}{2\sigma^2} - \frac{|r_2-h_{21}s_m-h_{22}s_n|^2}{2\sigma^2}} \middle| b_{1i}, b_{2i} \right)$$

It is also equivalent to finding $$\min_{s_m,s_n}(|r_1-h_{11}s_m-h_{21}s_n|^2 + |r_2-h_{21}s_m-h_{22}s_n|^2 \mid b_{1i}, b_{2i}) \quad (4)$$

In order to determine the bit metrics for a bit in symbol $s_1$, the following equation must be evaluated. For bit i in symbol $s_1$ to be '0', it is necessary to evaluate $$m_{1i}^0 = \min_{s_m \in S^0, s_n \in S}((|r_1-h_{11}s_m-h_{21}s_n|^2 + |r_2-h_{12}s_m-h_{22}s_n|^2) \mid b_{1i}=0) \quad (5)$$

Where $m_{1i}^0$ represents the bit metrics for bit i in received symbol $s_1$ to be '0'. S represents for the whole constellation point set, while $S^0$ represents the subset of the constellation point set such that bit $b_i$=0. For bit i in symbol $s_1$ to be '1', it is necessary to evaluate $$m_{1i}^1 = \min_{s_m \in S^1, s_n \in S}((|r_1-h_{11}s_m-h_{21}s_n|^2 + |r_2-h_{12}s_m-h_{22}s_n|^2) \mid b_{1i}=1) \quad (6)$$

where $S^1$ represents the subset of the constellation point set such that bit $b_i$=1.

Using the same method, it is possible to determine the bit metrics for transmitted symbol $s_2$. For bit i in symbol $s_2$ to be '0', it is necessary to evaluate $$m_{2i}^0 = \min_{s_m \in S, s_n \in S^0}((|r_1-h_{11}s_m-h_{21}s_n|^2 + |r_2-h_{12}s_m-h_{22}s_n|^2) \mid b_{2i}=0) \quad (7)$$

For bit i in symbol $s_2$ to be '1', it is necessary to evaluate $$m_{2i}^1 = \min_{s_m \in S, s_n \in S^1}((|r_1-h_{11}s_m-h_{21}s_n|^2 + |r_2-h_{12}s_m-h_{22}s_n|^2) \mid b_{2i}=1) \quad (8)$$

Then, the bit metrics pairs $(m_{1i}^0, m_{1i}^1)$ $(m_{2i}^0, m_{2i}^1)$ are sent to corresponding deinterleavers and Viterbi decoders for FEC decoding of each of the data streams.

Simulation results show that using optimal decoding, the proposed 108 Mbps MIMO system actually performs 4 dB better than the SISO 54 Mbps system at a BER of $10^{-4}$. However, the computation cost for the optimal decoding is very high. To obtain bit metrics for a bit in signal $s_1$ to be 0 and 1, it is necessary to evaluate 64*64 permutations of the $s_1$ and $s_2$ constellation, which cannot be accomplished cost effectively with existing computational capabilities. The computation cost for this 2 by 2 MIMO system decoding is too high to be practical.

Thus, there is a need for an alternative coding method to reduce the high computation cost when a 2 by 2 MIMO system based on and 54 Mbps IEEE 802.11a SISO system is employed for increasing the data transmission rate above 100 Mbps.

Figure 3A:
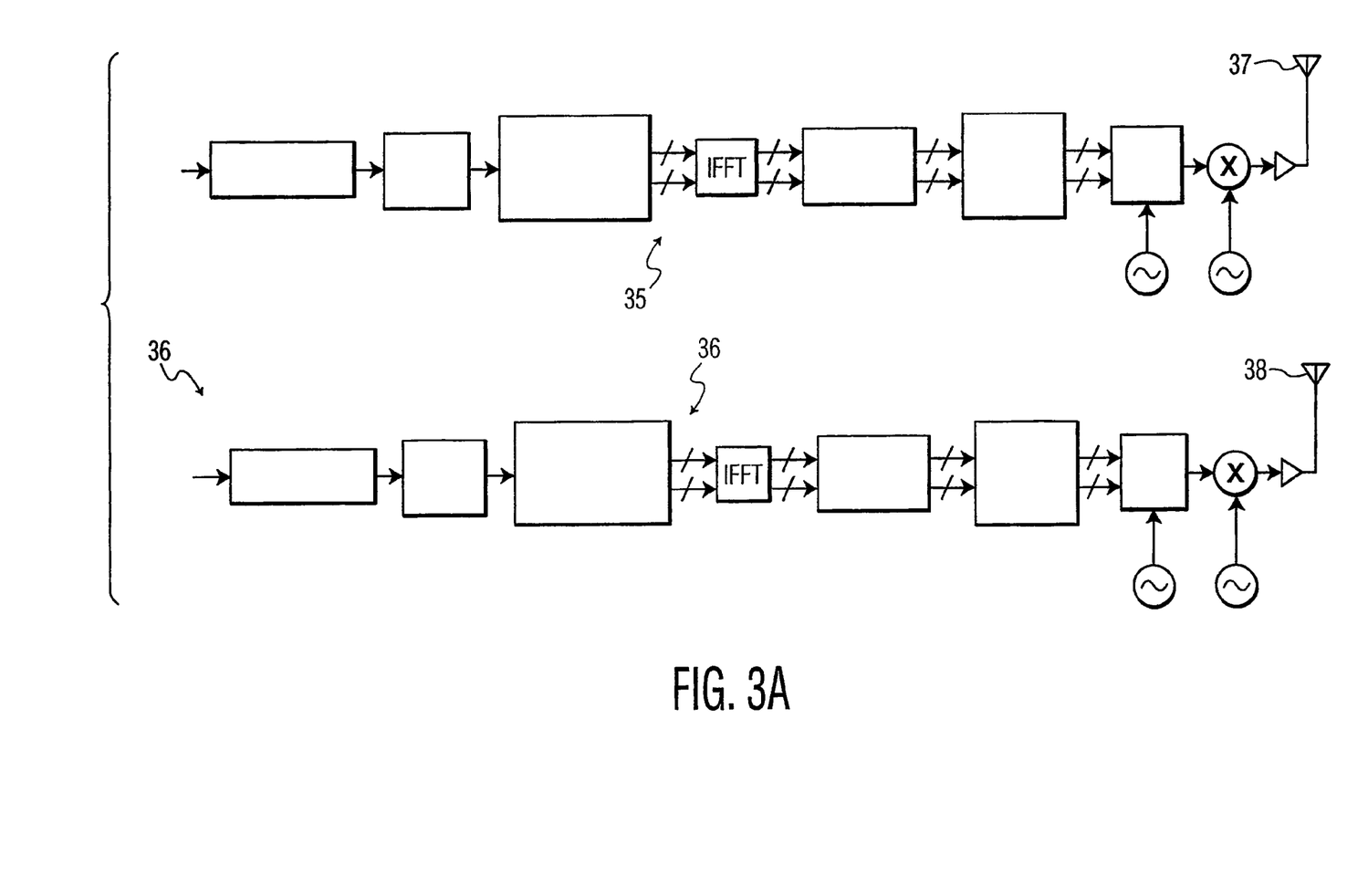
FIG. 3 illustrates a 108 Mbps 2 by 2 MIMO system based on the 54 Mbps SISO system of FIG. 1, according to a preferred embodiment of the present invention.
Figure 3B:
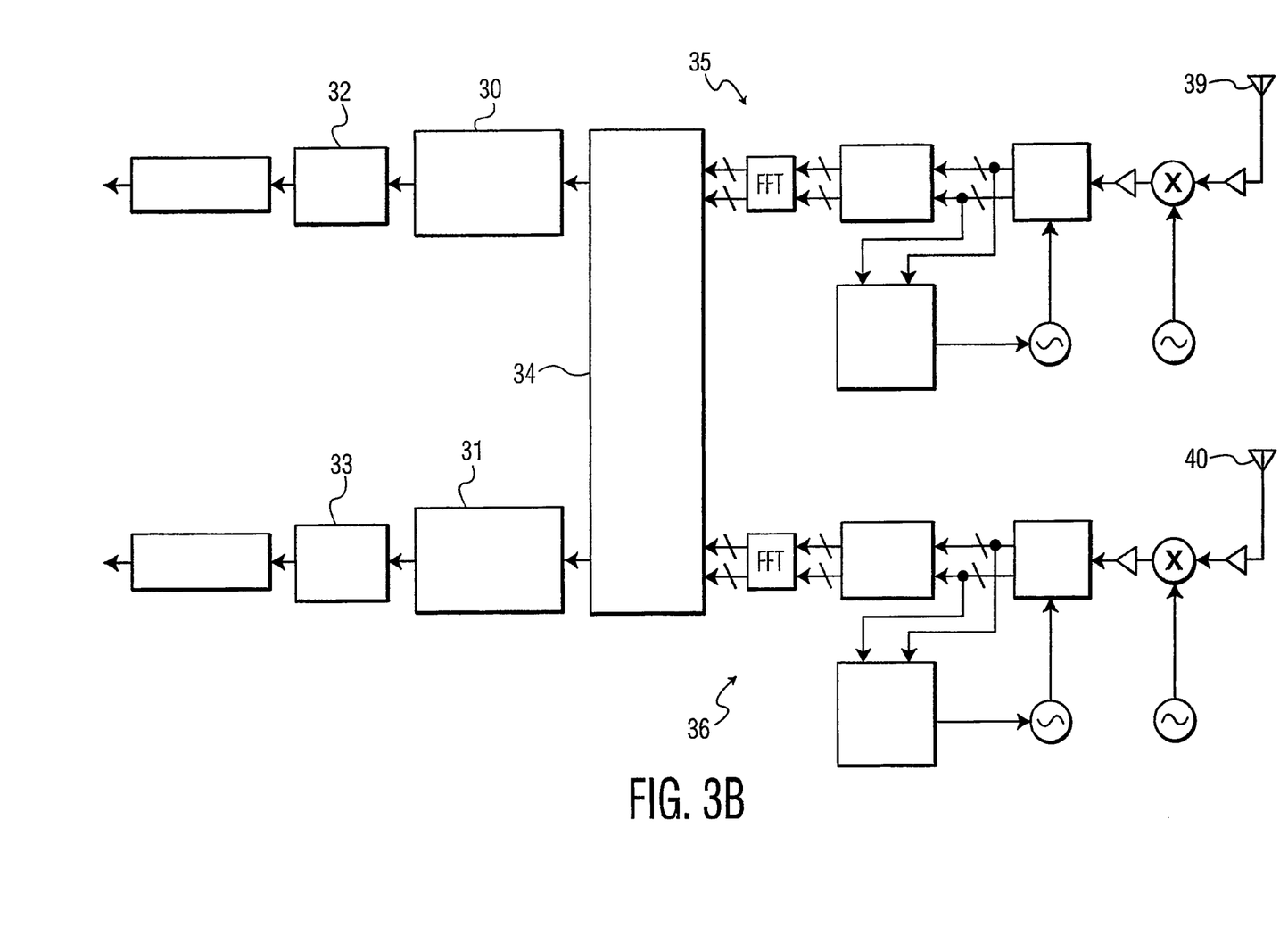

The present invention is a 108 Mbps 2 by 2 MIMO system based on a 54 Mbps SISO system, as illustrated in FIG. 3, that replaces optimal decoding with a simplified decoding method that has about the same computation cost as the optimal SISO decoder and about 1/64 the computation cost of the optimal MIMO decoder. In the system illustrated in FIG. 3, the separate demapping an deinterleaving module 10, of the prior art system illustrated in FIG. 1, is replaced by a shared demapping and signal separation unit 34 and the separate deinterleaving units 30 and 31.

The present invention employs a ZF guided maximum likelihood (ML) decoding method. For a SISO single carrier system, since a time-dispersed channel (frequency selective fading channel) brings the channel memory into the system, joint maximum likelihood (ML) equalization and decoding is not realistic because of the high computation cost. The general practice is to first use minimum-mean-square-error/zero forcing (MMSE/ZF) as the criteria to equalize the channel. Then the equalized signal is sent to a maximum likelihood (ML) detector for further decoding. However, this is a suboptimal system.

In a SISO OFDM system, since the system is designed to let each sub-carrier experience flat fading channel, the real maximum likelihood (ML) equalization and decoding can be implemented with affordable computational cost. Yet in a MIMO OFDM system, because of the large number of permutation evaluations of the constellation set required in the metrics calculation, the computation cost for real maximum likelihood (ML) equalization and decoding is too high to be practical.

One way to avoid the large number of permutation computations is to first find the approximate value of the transmitted symbols $s_1$ and $s_2$ and then use the maximum likelihood (ML) detection method to find the bit metrics for $s_1$ while taking $s_2$ as the value calculated by the ZF method. It is reasonable to make the assumption that when the SNR is high enough, the ZF decision is very close to the optimal maximum likelihood decision. Thus, the present invention incurs approximately the same computation cost in a MIMO system to get the bit metrics for the transmitted symbols $s_1$ and $s_2$ as the SISO system incurs for transmitted symbols s.

The preferred embodiments of the present invention employ a simplified decoding method. The details of the simplified decoding method are described below with reference to the drawings.

The received signal can be written as $$\begin{pmatrix} r_1 \\ r_2 \end{pmatrix} = \begin{pmatrix} h_{11} & h_{21} \\ h_{12} & h_{22} \end{pmatrix} \begin{pmatrix} s_1 \\ s_2 \end{pmatrix} + \begin{pmatrix} n_1 \\ n_2 \end{pmatrix}.$$

According to the ZF criteria, the transmitted signal can be estimated by the demapping and signal separation module 34 as $$\begin{pmatrix} \tilde{s}_1 \\ \tilde{s}_2 \end{pmatrix} = \begin{pmatrix} h_{11} & h_{21} \\ h_{12} & h_{22} \end{pmatrix}^{-1} \begin{pmatrix} r_1 \\ r_2 \end{pmatrix} \qquad (9)$$

Using the minimum Euclidean distance calculated for the ZF calculated symbol and constellation point, the demapping and signal separation module 34 obtains the estimated transmitted symbol by hard decision. The symbols after the hard decision operation can be represented as $$\begin{pmatrix} \hat{s}_1 \\ \hat{s}_2 \end{pmatrix}.$$

The bit metrics for transmitted symbol $s_1$ are then calculated by the demapping and signal separation module 34 as $$m_{1i}^0 = \min_{s_m \in S^0} ((|r_1 - h_{11}s_m - h_{21}\hat{s}_2|^2 + |r_2 - h_{12}s_m - h_{22}\hat{s}_2|^2) \mid b_{1i} = 0) \quad (10)$$

$$m_{1i}^1 = \min_{s_m \in S^1} ((|r_1 - h_{11}s_m - h_{21}\hat{s}_2|^2 + |r_2 - h_{12}s_m - h_{22}\hat{s}_2|^2) \mid b_{1i} = 1)$$

and bit metrics for transmitted symbol $s_2$ can then be calculated as $$m_{2i}^0 = \min_{s_n \in S^0} ((|r_1 - h_{11}\hat{s}_1 - h_{21}s_n|^2 + |r_2 - h_{12}\hat{s}_1 - h_{22}s_n|^2) \mid b_{2i} = 0) \quad (11)$$

$$m_{2i}^1 = \min_{s_n \in S^1} ((|r_1 - h_{11}\hat{s}_1 - h_{21}s_n|^2 + |r_2 - h_{12}\hat{s}_1 - h_{22}s_n|^2) \mid b_{2i} = 1)$$

where $S^p$ represents the subset of the constellation points such that bit $b_i$ is p where p=0 or 1. Then, the bit metrics pairs $(m_{1i}^0, m_{1i}^1)$ $(m_{2i}^0, m_{2i}^1)$ are sent to corresponding first and second deinterleavers 30 and 31 and different Viterbi decoders 33 and 34, respectively, for forward error correction (FEC) decoding of each data stream.

In a second preferred embodiment, a further simplified decoding method is provided based on the first preferred embodiment. Unlike the first preferred embodiment in which the demapping and signal separation module 34 uses the MIMO ML criteria to calculate the bit metrics for each bit in the two transmitted symbols after the ZF operation, the SISO ML is used by the demapping and signal separation module 34 to find the constellation points for each bit that satisfy $$\min_{s \in S_i^p} \|\tilde{s}_q - s\|^2 \qquad (12)$$

where q=1,2 and p∈{0,1}. Two constellation points are defined by the demapping and signal separation module 34 that correspond to the bit metrics calculation of (12) for bit i of the transmitted symbol $s_q$ to be $s_{qi}^p$. In SISO decoding, bit metrics calculated from (12) are sent to a Viterbi decoder for decoding. In MIMO decoding, equation (12) is only used by the demapping and signal separation module 34 to determine the constellation points that satisfy (12) and use these constellation points in MIMO ML criteria to calculate the bit metrics for each bit that are sent to a Viterbi decoder for decoding. That is, the bit metrics are calculated by the demapping and signal separation module 34 as $$m_{1i}^p = (\|r_1 - h_{11}s_{1i}^p - h_{21}\hat{s}_2\|^2 + \|r_2 - h_{12}s_{1i}^p - h_{22}\hat{s}_2\|^2)$$

$$m_{2i}^p = (\|r_1 - h_{11}\hat{s}_1 - h_{21}s_{2i}^p\|^2 + \|r_2 - h_{12}\hat{s}_1 - h_{22}s_{2i}^p\|^2) \qquad (13)$$

Then, the bit metrics pairs $(m_{1i}^0, m_{1i}^1)$ $(m_{2i}^0, m_{2i}^1)$ are sent to corresponding first and second deinterleavers 30 and 31 and different Viterbi decoders 33 and 34, respectively, for forward error correction (FEC) decoding of each data stream.

Figure 4A:
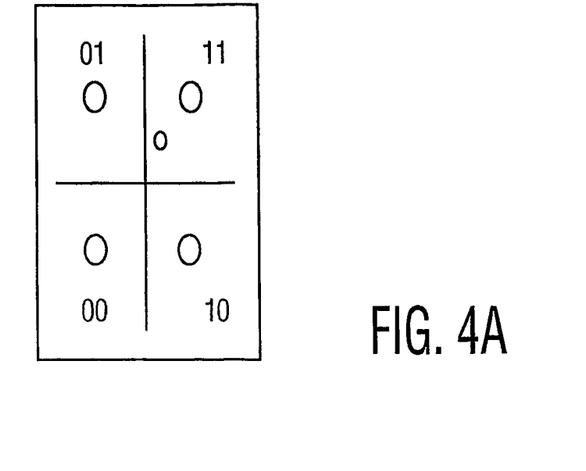
FIGS. 4A-C illustrate a Slice-Compare-Selection Operation.
Figure 4B:
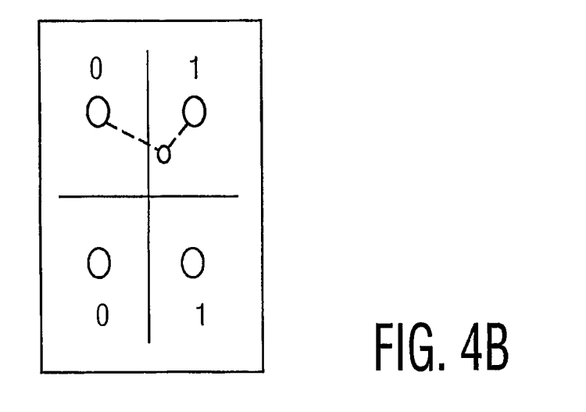
Figure 4C:
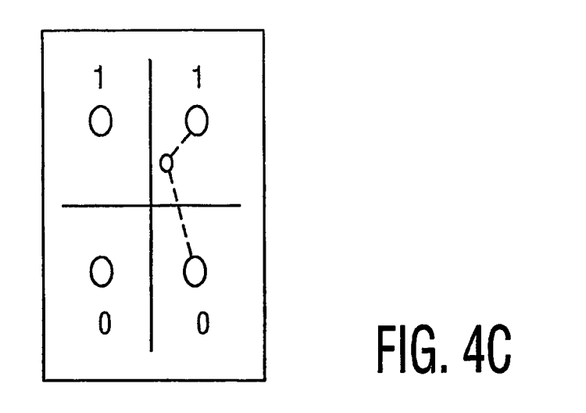

In a hardware implementation, the 12 constellation points for the 6 bits in one transmitted symbol can be obtained by a slice-compare-select operation. An example of quadrature-phase shift keying (QPSK) is illustrated in FIG. 4A. If the real part of the received symbol is considered, it is possible to determine that the two constellation points corresponding to bit $b_0$ are the two points connected by the dashed line in FIG. 4B. The same method can be used to determine the corresponding constellation points for bit $b_1$ by using the imaginary part of the received symbol, as shown in FIG. 4C. With the slicing method, the actual distance calculation of equation (12) is not needed. In the second preferred embodiment, the permutation in distance searching in the MIMO ML bit metrics calculation can be avoided, which reduces the computation cost of the MIMO ML bit metrics calculation.

Figure 5:
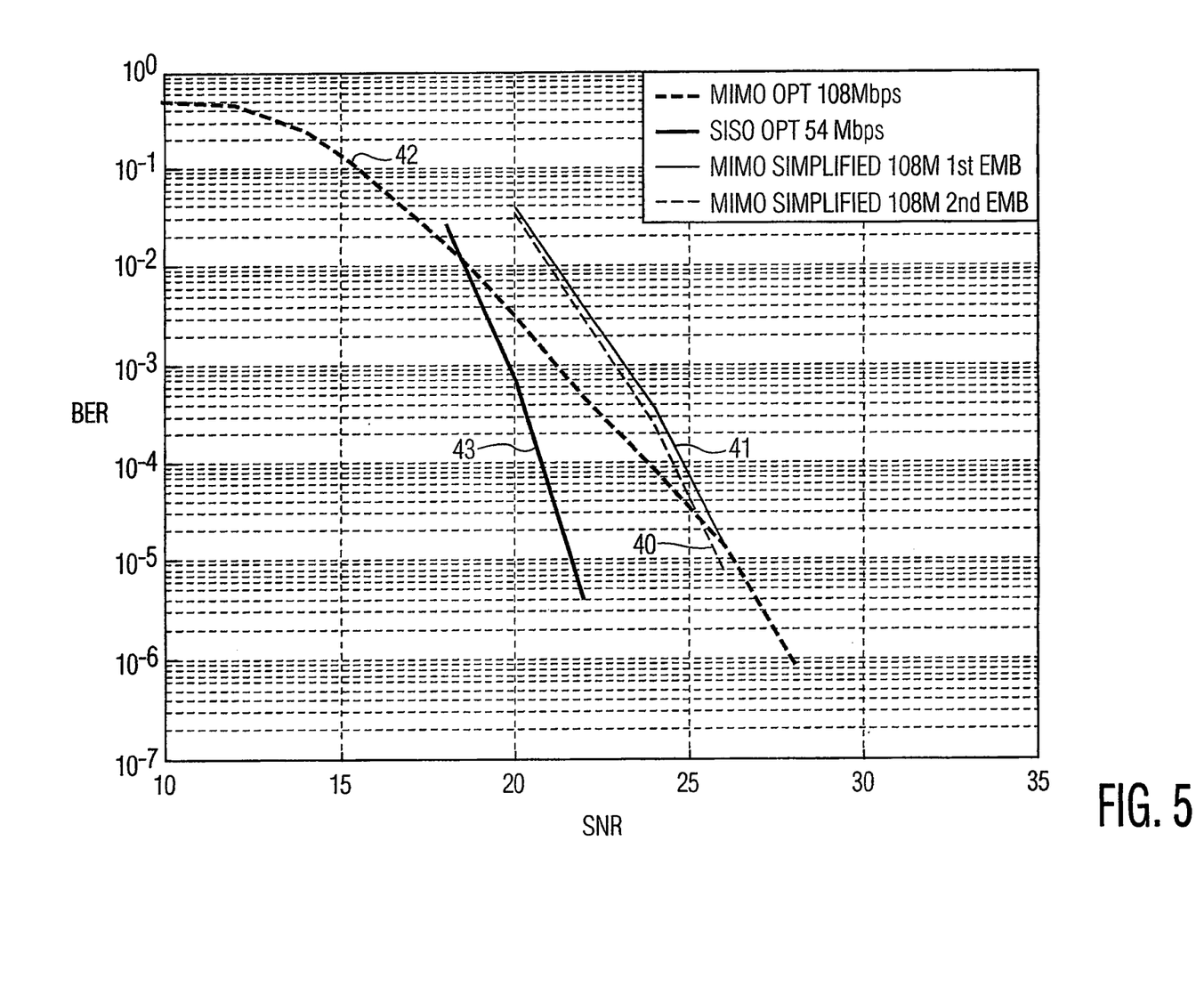
FIG. 5 shows simulation results comparing the 108 Mbps MIMO system of FIG. 3 with the 54 Mbps SISO system of FIG. 1.

Simulation results, shown in FIG. 5, confirm the performance of both embodiments of the present invention. The multipath channel simulated is the exponential Rayleigh fading channel defined in Bob O'Hara, Al Petrick; "The IEEE 802.11 Handbook: A Designer's Companion", December 1999, having a 40 ns rms delay spread. The four channels across the two transmission antennae and two receiving antennae are independent of each other, which means there is no correlation between any of the four channels. For each data point of the sign-to-noise-ratio vs. bit-error-rate (SNR vs. BER) curves of FIG. 5, 1 million bits equally distributed in 250 packets was simulated. It is reasonable to assume that the wireless channel for each antenna element is the same for each packet, while it is different for different packets. In all the simulations, ideal frequency and timing synchronization is assumed.

Simulation results show that although the performance of the first embodiment of the simplified decoding method of the present invention is about 4 dB worse than the optimal decoding method at a BER level of $10^{-4}$, it is almost the same as the optimal decoding for the SISO system at 54 Mbps 43. This result shows that the first embodiment of the present invention comprising a 2 by 2 MIMO system 41 can double the transmission data rate of the SISO system 43 for the same SNR at reasonable computation cost. The second embodiment provides the same improvement for a further reduced computation cost. Therefore, the simulation show that both embodiments of the present invention have about the same BER vs SNR performance, which is almost the same as SISO 54 Mbps system 43 and 4 dB less than MIMO optimal decoding system 42 at BER level of $10^{-4}$. And, the increase in transmission rate by double is obtained for no increase in computation cost in the first embodiment and a reduced computation cost in the second embodiment Referring to FIG. 4, a 2 by 2 MIMO system 42 based on IEEE 802.11a SISO system according to the present invention can provide a 108 Mbps transmission data rate that doubles the data rate of the IEEE 802.11a SISO system within the same range of SNR. Optimal decoding of the MIMO system 42 according to the prior art provides 4 dB better BER vs. SNR performance than the SISO 54 Mbps system 43 at BER level of $10^{-4}$ but the high computation cost of the optimal decoding makes such an implementation impractical. The present invention provides two preferred embodiments for ZF guided simplified MIMO decoding, 40 and 41, having computation costs that are almost the same as that of the optimal decoder for the 54 Mbps SISO system 43. Although each of the embodiments for a simplified method, 40 and 41, performs 4 dB worse than the optimal decoder for MIMO system 42, each provides almost the same SNR performance as the SISO 54 Mbps system 43 at the BER level of $10^{-4}$, but at the transmission data rate of 108 Mbps While the examples provided illustrate and describe a preferred embodiment of the present invention, it will be understood by those skilled in the art that various changes and modifications may be made, and equivalents may be substituted for elements thereof without departing from the true scope of the present invention. In addition, many modifications may be made to adapt the teaching of the present invention to a particular situation without departing from the central scope. Therefore, it is intended that the present invention not be limited to the particular embodiments disclosed as the best mode contemplated for carrying out the present invention, but that the present invention include all embodiments falling within the scope of the appended claims.

What is claimed is:

1. A 2×2 wireless local area network, comprising:
    a first and a second single input single output (SISO) system respectively having a first and second transmitter antenna that transmit a first and second transmitted signal $s_1$ and $s_2$;
    a first and second receiver antenna that receive a first and second received signal $r_1$ and $r_2$; and
    a demapping and signal separation module that employs zero forcing (ZF) to guide maximum likelihood (ML) decoding and is connected to said first and second SISO system and is adapted to process said first and second received signal,
    wherein a data transmission rate of the 2×2 system is greater than 100 Mbps at a bit error rate of $10^{-4}$ and a computation cost for decoding on the order of the decoding cost for an optimal SISO system;
    wherein the demapping and signal separation module employs zero forcing (ZF) of the first and second received signal, respectively, which received signals correspond to $$\begin{pmatrix} r_1 \\ r_2 \end{pmatrix} = \begin{pmatrix} h_{11} & h_{21} \\ h_{12} & h_{22} \end{pmatrix} \begin{pmatrix} s_1 \\ s_2 \end{pmatrix} + \begin{pmatrix} n_1 \\ n_2 \end{pmatrix}$$

and results in the first and second transmitted signal being calculated as $$\begin{pmatrix} \tilde{s}_1 \\ \tilde{s}_2 \end{pmatrix} = \begin{pmatrix} h_{11} & h_{21} \\ h_{12} & h_{22} \end{pmatrix}^{-1} \begin{pmatrix} r_1 \\ r_2 \end{pmatrix}$$

and finds the minimum Euclidean distance between ZF calculated symbol and a constellation point to estimate by hard decision the first and second transmitted signal as first and second estimated signal as $$\begin{pmatrix} \hat{s}_1 \\ \hat{s}_2 \end{pmatrix}$$

which are then used to guide the maximum likelihood (ML) decoding,
wherein, $h_{ij}$ represents a channel from the $i^{th}$ transmitter antenna to the $j^{th}$ receiver antenna and $n_i$ are noise signal for i,j=1,2.

2. The 2×2 system of claim 1, wherein respective bit metrics calculated for first and second transmitted signal $s_1$ and $s_2$ are calculated using $$\begin{pmatrix} \hat{s}_1 \\ \hat{s}_2 \end{pmatrix}$$

as follows for $s_1$ $$m_{1i}^0 = \min_{s_m \in S^0} ((|r_1 - h_{11}s_m - h_{21}\hat{s}_2|^2 + |r_2 - h_{12}s_m - h_{22}\hat{s}_2|^2) \mid b_{1i} = 0)$$

$$m_{1i}^1 = \min_{s_m \in S^1} ((|r_1 - h_{11}s_m - h_{21}\hat{s}_2|^2 + |r_2 - h_{12}s_m - h_{22}\hat{s}_2|^2) \mid b_{1i} = 1)$$

and for $s_2$ $$m_{2i}^0 = \min_{s_n \in S^0} ((|r_1 - h_{11}\hat{s}_1 - h_{21}s_n|^2 + |r_2 - h_{12}\hat{s}_1 - h_{22}s_n|^2) \mid b_{2i} = 0)$$

$$m_{2i}^1 = \min_{s_n \in S^1} ((|r_1 - h_{11}\hat{s}_1 - h_{21}s_n|^2 + |r_2 - h_{12}\hat{s}_1 - h_{22}s_n|^2) \mid b_{2i} = 1)$$

and the bit metrics pairs $(m_{1i}^0, m_{1i}^1)$ $(m_{2i}^0, m_{2i}^1)$ are sent to a respective first and second deinterleaver and a first and second Viterbi decoder for decoding,
wherein $b_{1i}$ and $b_{2i}$ respectively is a bit in signal $s_1$ and $s_2$ for which a decision is being made.

3. The 2×2 system of claim 1, wherein the demapping and signal separation module obtains a first and second constellation point, $s_{1i}^P$ and $s_{2i}^P$, satisfying the minimum Euclidean distance from first and second transmitted signal $\tilde{s}_1$ and $\tilde{s}_2$ for bit i $$\min_{s \in S_i^p} \|\tilde{s}_q - s\|^2$$

where q=1, 2 and $s_i^p$ represents the subset of a constellation point set for bit i, the bit for which a decision is being made, such that p∈{0,1}, uses these constellation points as input to a maximum likelihood calculation in the form of a bit metrics calculation for p=0,1

$$m_{1i}^p = (\|r_1 - h_{11}s_{1i}^p - h_{21}\hat{s}_2\|^2 + \|r_2 - h_{12}s_{1i}^p - h_{22}\hat{s}_2\|^2)$$

$$m_{2i}^p = (\|r_1 - h_{11}\hat{s}_1 - h_{21}s_{2i}^p\|^2 + \|r_2 - h_{12}\hat{s}_1 - h_{22}s_{2i}^p\|^2)$$

and the bit metrics pairs $(m_{1i}^0, m_{1i}^1)$ $(m_{2i}^0, m_{2i}^1)$ are sent to a respective first and second deinterleaver and a first and second Viterbi decoder for decoding.

4. The 2×2 system of claim 1, wherein the demapping and signal separation module performs a slice-compare-select operation to determine a first and second constellation point, $s_{1i}^P$ and $s_{2i}^P$, corresponding to the ZF signal which first and second constellation point is used as input to a maximum likelihood calculation in the form of a bit metrics calculation for p=0,1

$$m_{1i}^p = (\|r_1 - h_{11}s_{1i}^p - h_{21}\hat{s}_2\|^2 + \|r_2 - h_{12}s_{1i}^p - h_{22}\hat{s}_2\|^2)$$

$$m_{2i}^p = (\|r_1 - h_{11}\hat{s}_1 - h_{21}s_{2i}^p\|^2 + \|r_2 - h_{12}\hat{s}_1 - h_{22}s_{2i}^p\|^2)$$

and the bit metrics pairs $(m_{1i}^0, m_{1i}^1)$ $(m_{2i}^0, m_{2i}^1)$ are sent to a respective first and second deinterleaver and a first and second Viterbi decoder for decoding.

5. The 2×2 system of claim 1, wherein said first and second SISO system is based on a 54 Mbps IEEE 802.11a SISO orthogonal frequency division multiplexing (OFDM) system.

* * * * *